(12) United States Patent
Naneix

(10) Patent No.: US 12,476,561 B2
(45) Date of Patent: Nov. 18, 2025

(54) ANTI-SURGE ELECTRICAL CONVERTER

(71) Applicant: SAFRAN ELECTRICAL & POWER, Blagnac (FR)

(72) Inventor: Philippe Naneix, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 18/577,635

(22) PCT Filed: Jul. 20, 2022

(86) PCT No.: PCT/IB2022/056702
§ 371 (c)(1),
(2) Date: Jan. 8, 2024

(87) PCT Pub. No.: WO2023/286041
PCT Pub. Date: Jan. 19, 2023

(65) Prior Publication Data
US 2024/0322720 A1    Sep. 26, 2024

(30) Foreign Application Priority Data

Jul. 13, 2021 (FR) ..................................... 2107603

(51) Int. Cl.
*H02P 9/02* (2006.01)
*H02M 3/44* (2006.01)
*H02M 7/64* (2006.01)

(52) U.S. Cl.
CPC ................ *H02P 9/02* (2013.01); *H02M 3/44* (2013.01); *H02M 7/64* (2013.01)

(58) Field of Classification Search
CPC ......... H02P 9/02; H02M 5/2932; H02M 3/22; H02M 3/34; H02M 3/36; H02M 3/44; H02M 7/64
See application file for complete search history.

(56) References Cited

U.S. PATENT DOCUMENTS 10,784,802 B2 *  9/2020  De Wergifosse ...... H02K 17/42
2015/0288271 A1 * 10/2015  Kuznetsov ............. H02P 25/22
                                                    310/55

(Continued)

FOREIGN PATENT DOCUMENTS

| CN | 106817057 A | 6/2017 |
|---|---|---|
| DE | 10 2014 206 518 A1 | 10/2014 |
| DE | 10 2015 104 936 A1 | 10/2015 |

OTHER PUBLICATIONS

Machine Translation of DE102014206518 (Year: 2014).*

(Continued)

*Primary Examiner* — Tulsidas C Patel
*Assistant Examiner* — Thomas K Quigley
(74) *Attorney, Agent, or Firm* — CHRISTENSEN O'CONNOR JOHNSON KINDNESS PLLC

(57) ABSTRACT

An electrical converter includes an inverter configured to provide at least one input AC voltage from an input DC voltage. The electrical converter further includes an AC-to-AC voltage converter configured to provide an output AC voltage from the at least one input AC voltage such that the output AC voltage has an amplitude that depends on a frequency of the at least one input AC voltage. A rectifier designed is configured to provide an output DC voltage from the output AC voltage.

6 Claims, 1 Drawing Sheet

(56) References Cited

U.S. PATENT DOCUMENTS

2016/0380437 A1\* 12/2016 Casimir .................. H02M 7/06
                                                    307/9.1
2018/0015831 A1   1/2018 Rozman et al.
2018/0309397 A1\* 10/2018 De Wergifosse ...... H02K 17/42
2021/0159732 A1\*  5/2021 Czimmek ............... H02J 50/12
2022/0224265 A1\*  7/2022 Jöckel .................... F03D 7/026

OTHER PUBLICATIONS

International Search Report mailed Sep. 26, 2022, issued in corresponding International Application No. PCT/IB2022/056702, filed Jul. 20, 2022, 5 pages.
Written Opinion mailed Sep. 26, 2022, issued in corresponding International Application No. PCT/IB2022/056702, filed Jul. 20, 2022, 4 pages.

\* cited by examiner

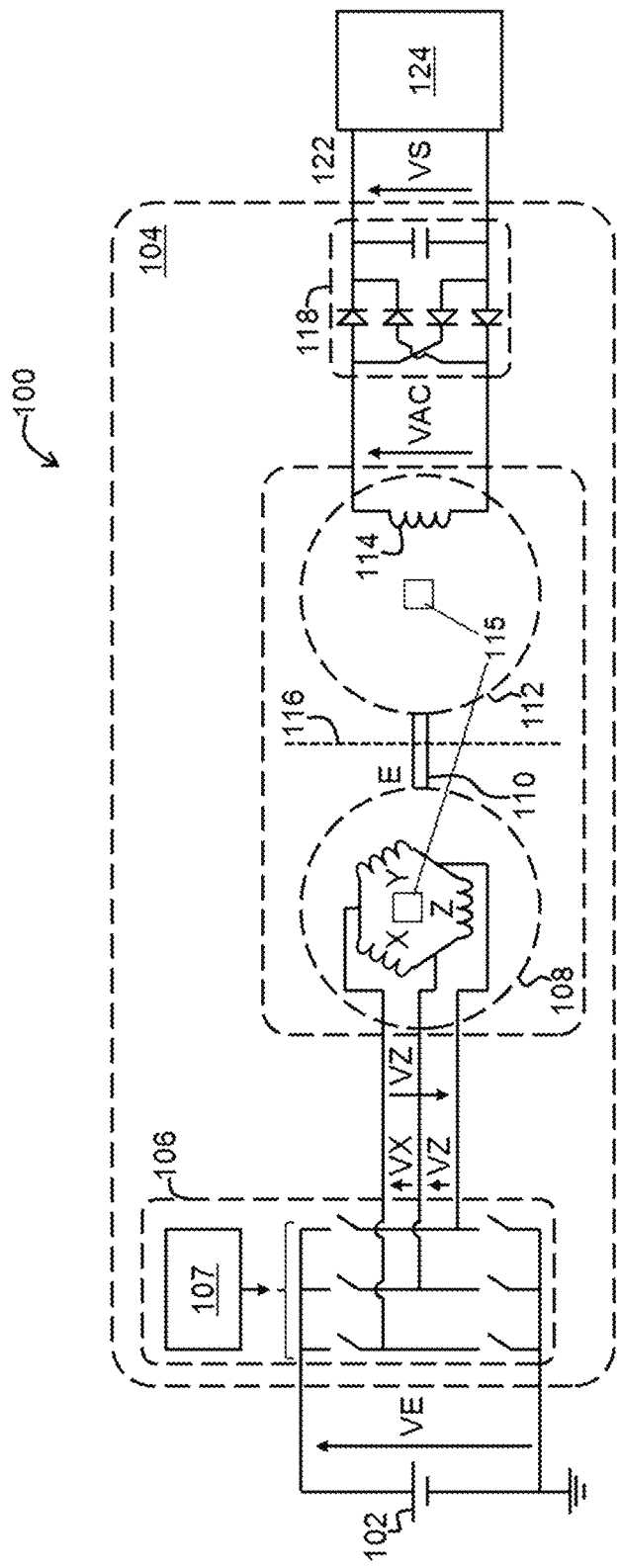

ANTI-SURGE ELECTRICAL CONVERTER

FIELD OF THE DISCLOSURE

The present disclosure relates to an anti-surge propagation electrical converter.

BACKGROUND

The prior art includes DC-DC converters with galvanic isolation, such as the forward converter. In this type of electrical converter, a controllable switch alternately connects and disconnects a DC voltage source to a primary winding of a transformer. When connected to the primary, the voltage source loads the transformer. When the DC voltage source is disconnected, the transformer discharges via a secondary winding into a capacitor designed to have a DC output voltage. A control device is provided to regulate the output DC voltage by controlling a duty ratio of opening and closing the switch.

In the event that the electrical converter faults, there is a risk of the input DC voltage propagating to the output of the electrical converter, so that the output DC voltage can become very high. In the event that the electrical converter is used in an aircraft to power equipment critical to flight, the propagation of the overvoltage can damage the equipment and lead to a catastrophic situation for the aircraft.

It may therefore be desirable to provide an electrical converter which allows at least one portion of the aforementioned problems and constraints to be overcome.

SUMMARY

An electrical converter is therefore proposed, characterised in that it comprises:
  an inverter designed to provide at least one so-called input AC voltage from a so-called input DC voltage;
  an AC-to-AC voltage converter designed to provide a so-called output AC voltage from the input AC voltage(s), such that the output AC voltage has an amplitude that depends on a frequency F of the input AC voltage(s), the AC-to-AC voltage converter comprising:
    an electric motor designed to provide mechanical rotational energy from the input AC voltages, and
    an electric generator designed to provide a so-called output AC voltage from the mechanical rotational energy; and
  a rectifier designed to provide a so-called output DC voltage from the output AC voltage.

Optionally, the electric motor is a permanent magnet synchronous motor.

Optionally, the electric motor and the electric generator comprise a common ferromagnetic core.

Also optionally, the inverter comprises at least two switching arms each designed to receive the input DC voltage and each having two switches connected to each other at a midpoint, the input AC voltage(s) being respectively provided between the pair(s) of midpoints.

Optionally, the inverter also comprises a control device designed to control the switching arms independently of the output DC voltage.

An electrical installation is also proposed, comprising:
  an electrical converter according to the disclosure; and
  a DC voltage source designed to provide the input DC voltage.

Optionally, the electrical installation also comprises an aircraft computer designed to be powered by the output DC voltage.

An aircraft comprising an electrical installation according to the disclosure is also proposed.

DESCRIPTION OF THE DRAWING

The disclosure will be better understood with the aid of the following description, given solely by way of example and with reference to the single FIGURE, which is an electrical diagram of an example of an electrical installation in which the disclosure is implemented.

DETAILED DESCRIPTION

With reference to the FIGURE, an example of an electrical installation 100 intended to equip an aircraft and in which the disclosure is implemented will now be described.

The electrical installation 100 firstly comprises a DC voltage source 102 designed to provide a so-called input DC voltage VE. The DC voltage source 102 comprises one or more batteries, for example. The input DC voltage VE is preferably greater than 100 V, for example 270 V, 600 V or 800 V.

The electrical installation 100 also comprises an electrical converter 104 designed to convert the input DC voltage VE into a so-called output DC voltage VS, preferably lower than the input DC voltage VE. For example, the output DC voltage is 28 V. The electrical converter 104 is therefore a DC-DC converter.

The electrical converter 104 firstly comprises an inverter 106 designed to provide so-called input AC voltages VX, VY, VZ from the input DC voltage VE. In the example described, the inverter 106 is designed to provide three input AC voltages VX, VY, VZ, with a relative phase shift of 120° so as to form a three-phase voltage system. The input AC voltages VX, VY, VZ also have a frequency F which can vary as described below.

In the example described, the inverter 106 comprises several switching arms each designed to receive the input DC voltage VE. Each switching arm then comprises a so-called high-side switch and a so-called low-side switch, connected to each other at a midpoint. The high-side and/or low-side switch can be controlled. Each switch is, for example, a semiconductor switch, such as a transistor switch like a MOSFET or an IGBT.

The input AC voltages VX, VY, VZ are then respectively provided between the pairs of midpoints, as shown in the FIGURE, and are alternately the input DC voltage VE and its opposite.

The inverter 106 also comprises a device 107 for controlling the switching arms. The control device 107 is designed to switch the switching arms at a predefined switching frequency and according to a duty ratio changing over time and repeating according to the frequency F. The control device 107 is designed to change the duty ratio in an open loop, i.e., independently of the output DC voltage VS or, more generally, of any electrical quantity located downstream of a galvanic isolation barrier 116 which will be described later.

The electrical converter 104 also comprises an electric motor 108 designed to provide mechanical rotational energy E from the input AC voltages VX, VY, VZ.

For example, the electric motor 108 comprises stator phases (three in the example described, respectively designated by the references X, Y and Z) designed to respectively receive the input AC voltages VX, VY, VZ. In response to the input AC voltages VX, VY, VZ, the stator phases are designed to generate a rotating magnetic field driving a rotor 110 of the electric motor 108 in rotation, at a rotational speed that depends on the frequency F. The rotor 110 thus provides the mechanical rotational energy E.

Preferably, the electric motor 108 is a synchronous motor. The rotor 110 therefore has a rotational speed V proportional to the frequency F.

Even more preferably, the motor 108 is a permanent magnet motor on the rotor 110. In this way, a rotor magnetic field of known value is easily generated by the permanent magnets and can interact with the stator magnetic field to rotate the rotor 110. As the rotor magnetic field is known, it does not need to be controlled, which simplifies the control of the electric motor 108.

The electrical converter 104 further comprises an electric generator 112 designed to provide a so-called output AC voltage VAC from the mechanical rotational energy E. In the example described, the electric generator 112 comprises a stator phase 114 with respect to which the rotor 110 rotates, thereby generating the output AC voltage VAC in the stator phase 114. In this way, the output AC voltage VAC has an amplitude which depends on the rotational speed of the rotor 110 and therefore on the frequency F of the input AC voltage(s) VX, VY, VZ. In addition, the amplitude of the output AC voltage VAC is independent of the amplitudes of the input AC voltages VX, VY, VZ.

In the FIGURE, the electrical machines 108, 112 are shown as separate, but in practice they could be grouped together. In this case, the stator phases X, Y, Z and 114 could be mounted on the same ferromagnetic core 115.

By passing through the mechanical energy E, a very strong galvanic insulation barrier 116 is obtained.

The electric motor 108 followed by the electric generator 112 thus form an AC-to-AC voltage converter designed to provide an output AC voltage from the input AC voltage(s), so that the output AC voltage has an amplitude that depends on a frequency F of the input AC voltage(s), but independent of an amplitude of each input AC voltage. In addition, this AC/AC voltage converter has the galvanic isolation barrier 116.

The electrical converter 104 also comprises a rectifier 118 designed to produce an output DC voltage VS from the output AC voltage VAC.

The rectifier 118 is preferably passive. For example, as shown in the FIGURE, the rectifier 118 may comprise a full diode bridge followed by a voltage smoothing capacitor, the output DC voltage VS being provided across the smoothing capacitor.

The electrical installation 100 further comprises a bus 122 designed to receive the output DC voltage VS, and one or more items of equipment of the aircraft (collectively referred to as 124) connected to the bus 122 to receive the output DC voltage VS for their power supply.

The items of equipment 124 connected to the bus 122 are preferably critical items of equipment for the aircraft, such as, for example, an aircraft computer such as a so-called mission computer which enables the aircraft to be flown or a so-called avionics computer which transmits all the status information of the aircraft systems throughout the flight.

In the event of an overvoltage causing a significant increase in the input DC voltage VE, this leads to an increase in the input AC voltages VX, VY, VZ but not in their frequency F, so that the output DC voltage VS remains unchanged.

Nor can this overvoltage reach the items of equipment 124 via the control device 107 because the latter is located upstream of the galvanic isolation barrier 116, with no connection to the downstream side due to its open-loop operation.

It is clear that an electrical converter such as the one described above allows the propagation of an overvoltage to be avoided, which could be harmful to the downstream items of equipment powered by the electrical converter.

It will be further noted that the disclosure is not limited to the embodiments described above. In fact, it will appear to the person skilled in the art that various modifications can be made to the above-described embodiments, in the light of the teaching just disclosed.

In the foregoing detailed presentation of the disclosure, the terms used should not be interpreted as limiting the disclosure to the embodiments exposed in the present description but should be interpreted to include all equivalents the anticipation of which is within the reach of the person skilled in the art by applying his general knowledge to the implementation of the teaching just disclosed.

The invention claimed is:

1. An electrical converter, comprising:
    an inverter configured to provide at least one input AC voltage from an input DC voltage;
    an AC-to-AC voltage converter configured to provide an output AC voltage from the at least one input AC voltage, such that the output AC voltage has an amplitude that depends on a frequency of the at least one input AC voltage, the AC-to-AC voltage converter comprising:
        an electric motor configured to provide mechanical rotational energy from the at least one input AC voltage, and
        an electric generator designed to provide an output AC voltage from the mechanical rotational energy; and
    a rectifier configured to provide an output DC voltage from the output AC voltage;
    wherein the inverter comprises at least two switching arms each designed to receive the input DC voltage and each having two switches connected to each other at a midpoint, the at least one input AC voltage being respectively provided between the one or more pair of midpoints;
    wherein the inverter further comprises a control device configured to control the switching arms according to an open-loop operation so that the switching arms are controlled independently of the output DC voltage, that is to say without taking into account the output DC voltage.

2. The electrical converter according to claim 1, wherein the electric motor is a permanent magnet synchronous motor.

3. The electrical converter according to claim 1, wherein the electric motor and the electric generator comprise a common ferromagnetic core.

4. An electrical installation comprising:
    an electrical converter according to claim 1; and
    a DC voltage source configured to provide the input DC voltage.

5. The electrical installation according to claim 4, further comprising an aircraft computer configured to be powered by the output DC voltage.

6. An aircraft comprising an electrical installation according to claim 4.

* * * * *